US012625722B2

(12) United States Patent
Ganesan et al.

(10) Patent No.: US 12,625,722 B2
(45) Date of Patent: May 12, 2026

(54) SEMANTIC-AWARE WORKFLOW MODIFICATION AND EXECUTION WITH EXTRACTION OF MISSING PARAMETER

(71) Applicant: Dell Products L.P., Round Rock, TX (US)

(72) Inventors: Vaideeswaran Ganesan, Bangalore (IN); Pravin Janakiram, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 927 days.

(21) Appl. No.: 17/586,124

(22) Filed: Jan. 27, 2022

(65) Prior Publication Data

US 2023/0236872 A1 Jul. 27, 2023

(51) Int. Cl.
*G06F 9/46* (2006.01)
*G06F 40/30* (2020.01)

(52) U.S. Cl.
CPC ............... *G06F 9/46* (2013.01); *G06F 40/30* (2020.01)

(58) Field of Classification Search
None
See application file for complete search history.

(56) References Cited

U.S. PATENT DOCUMENTS 10,382,353 B1 * 8/2019 Krishnan ............ H04L 41/0806
2005/0238050 A1 * 10/2005 Pung ........................ H04L 69/32
370/469

2009/0234884 A1 * 9/2009 Stejic .................... G06F 16/289
2014/0358998 A1 * 12/2014 Park ........................ H04L 67/34
709/203

(Continued)

OTHER PUBLICATIONS

Aidi Pi et al. Semantic-Aware Workflow Construction and Analysis for Distributed Data Analytics Systems, HPDC'19, Jun. 22-29, 2019, pp. 1-12, https://par.nsf.gov/servlets/purl/10142536.

(Continued)

*Primary Examiner* — Aimee Li
*Assistant Examiner* — Zujia Xu
(74) *Attorney, Agent, or Firm* — Ryan, Mason & Lewis, LLP

(57) ABSTRACT

Techniques are provided for semantic-aware workflow creation and execution. One method comprises obtaining a semantic-aware workflow; identifying objects specified in the semantic-aware workflow; performing, for at least one of the identified objects: extracting parameters corresponding to the at least one identified object using an attribute registry associated with the semantic-aware workflow; selecting, using the attribute registry, an extracted parameter that takes, as a value, another identified object; and adding an operation to the semantic-aware workflow using the at least one identified object, and the corresponding selected extracted parameter that takes, as a value, the other identified object. In response to determining that the selected extracted parameter comprises a missing mandatory parameter, a first object can be identified in the identified objects that can be converted to the missing mandatory parameter; and the missing mandatory parameter can be generated for the selected extracted parameter using parameter values of the first object.

20 Claims, 13 Drawing Sheets

(56)        References Cited

U.S. PATENT DOCUMENTS

2019/0324893 A1 * 10/2019  Vaishnav  ............ G06F 11/3698

OTHER PUBLICATIONS

Salvador Tamarit et al. Towards a Semantics-Aware Code Transformation Tool Chain for Heterogeneous Systems, A. Villanueva (Ed.): PROLE 2016, EPTCS 237, 2017, pp. 34-51, doi: 10.4204/EPTCS.237.3, https://arxiv.org/pdf/1701.03319.pdf.
Claire Maiza et al. The W-SEPT Project: Towards Semantic-Aware WCET Estimation, 17th International Workshop on Worst-Case Execution Times Analysis (WCET 2017). Editor: Jan Reineke; Article No. 9, pp. 9:1-9:13, https://drops.dagstuhl.de/opus/volltexte/2017/7309/pdf/OASIcs-WCET-2017-9.pdf.

* cited by examiner

Figure 6:
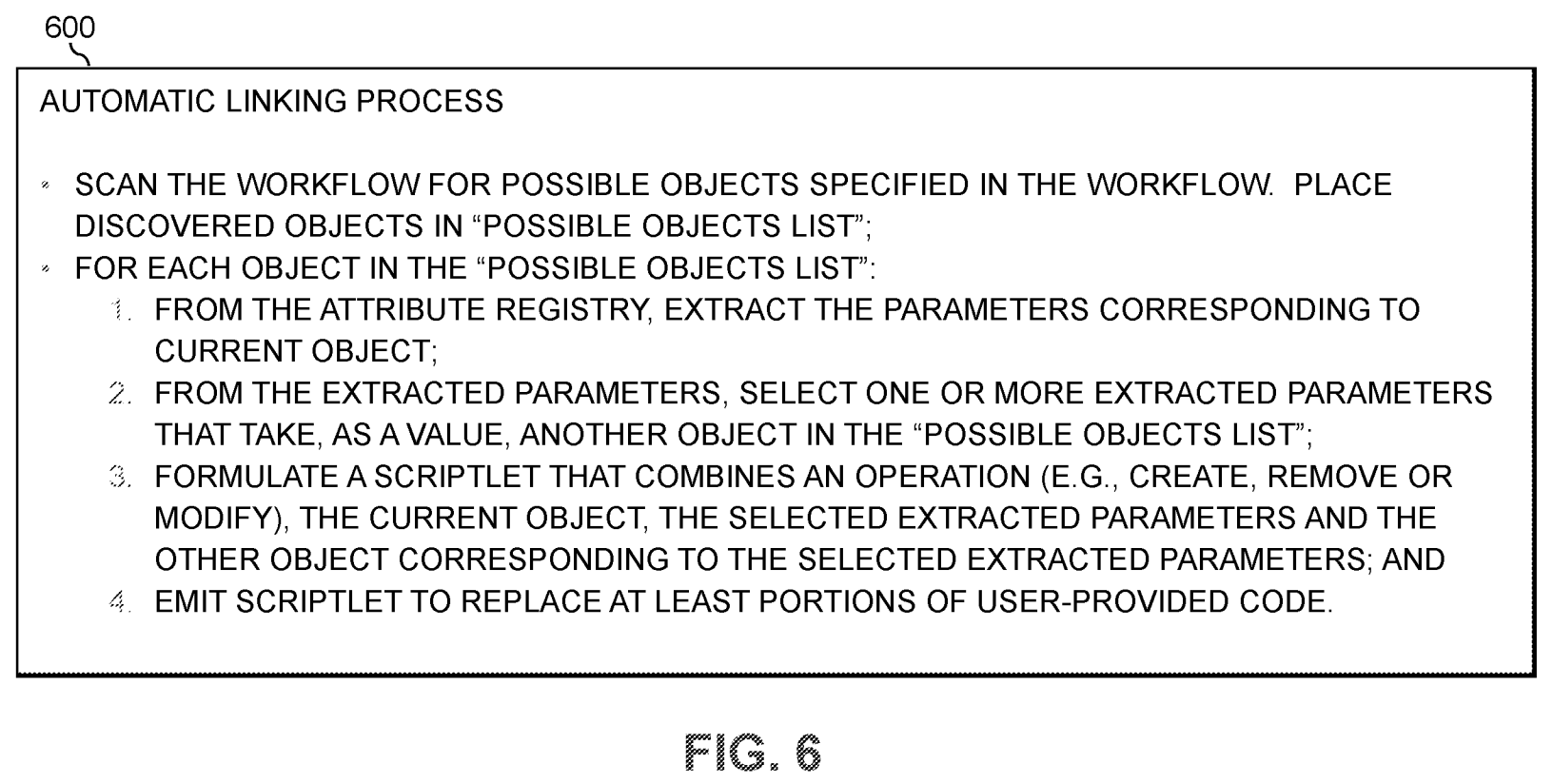

600

AUTOMATIC LINKING PROCESS

° SCAN THE WORKFLOW FOR POSSIBLE OBJECTS SPECIFIED IN THE WORKFLOW. PLACE DISCOVERED OBJECTS IN "POSSIBLE OBJECTS LIST";

° FOR EACH OBJECT IN THE "POSSIBLE OBJECTS LIST":

1. FROM THE ATTRIBUTE REGISTRY, EXTRACT THE PARAMETERS CORRESPONDING TO CURRENT OBJECT;

2. FROM THE EXTRACTED PARAMETERS, SELECT ONE OR MORE EXTRACTED PARAMETERS THAT TAKE, AS A VALUE, ANOTHER OBJECT IN THE "POSSIBLE OBJECTS LIST";

3. FORMULATE A SCRIPTLET THAT COMBINES AN OPERATION (E.G., CREATE, REMOVE OR MODIFY), THE CURRENT OBJECT, THE SELECTED EXTRACTED PARAMETERS AND THE OTHER OBJECT CORRESPONDING TO THE SELECTED EXTRACTED PARAMETERS; AND

4. EMIT SCRIPTLET TO REPLACE AT LEAST PORTIONS OF USER-PROVIDED CODE.

Figure 7:
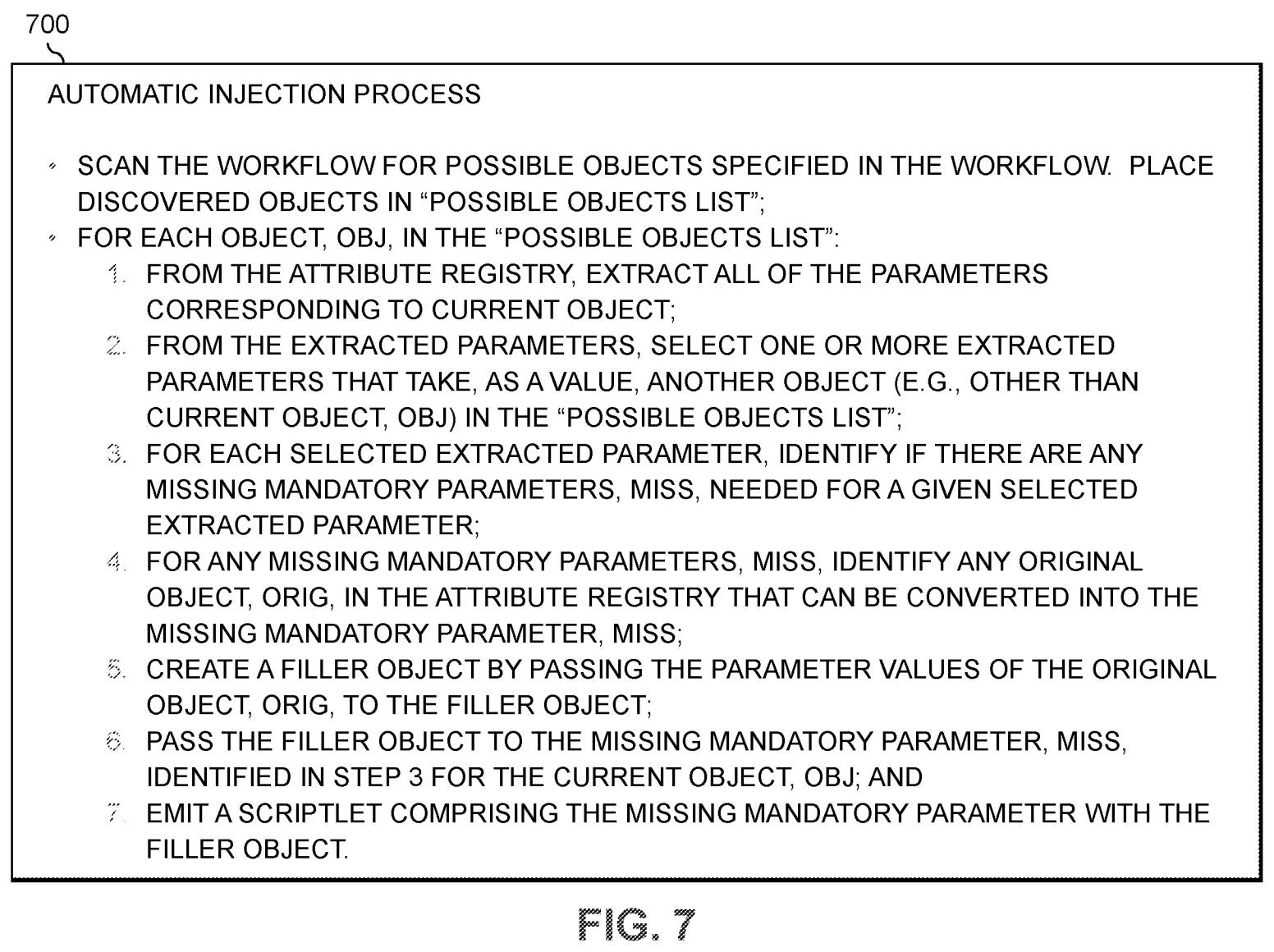

AUTOMATIC INJECTION PROCESS

• SCAN THE WORKFLOW FOR POSSIBLE OBJECTS SPECIFIED IN THE WORKFLOW. PLACE DISCOVERED OBJECTS IN "POSSIBLE OBJECTS LIST";

• FOR EACH OBJECT, OBJ, IN THE "POSSIBLE OBJECTS LIST":

1. FROM THE ATTRIBUTE REGISTRY, EXTRACT ALL OF THE PARAMETERS CORRESPONDING TO CURRENT OBJECT;

2. FROM THE EXTRACTED PARAMETERS, SELECT ONE OR MORE EXTRACTED PARAMETERS THAT TAKE, AS A VALUE, ANOTHER OBJECT (E.G., OTHER THAN CURRENT OBJECT, OBJ) IN THE "POSSIBLE OBJECTS LIST";

3. FOR EACH SELECTED EXTRACTED PARAMETER, IDENTIFY IF THERE ARE ANY MISSING MANDATORY PARAMETERS, MISS, NEEDED FOR A GIVEN SELECTED EXTRACTED PARAMETER;

4. FOR ANY MISSING MANDATORY PARAMETERS, MISS, IDENTIFY ANY ORIGINAL OBJECT, ORIG, IN THE ATTRIBUTE REGISTRY THAT CAN BE CONVERTED INTO THE MISSING MANDATORY PARAMETER, MISS;

5. CREATE A FILLER OBJECT BY PASSING THE PARAMETER VALUES OF THE ORIGINAL OBJECT, ORIG, TO THE FILLER OBJECT;

6. PASS THE FILLER OBJECT TO THE MISSING MANDATORY PARAMETER, MISS, IDENTIFIED IN STEP 3 FOR THE CURRENT OBJECT, OBJ; AND

7. EMIT A SCRIPTLET COMPRISING THE MISSING MANDATORY PARAMETER WITH THE FILLER OBJECT.

Figure 8:
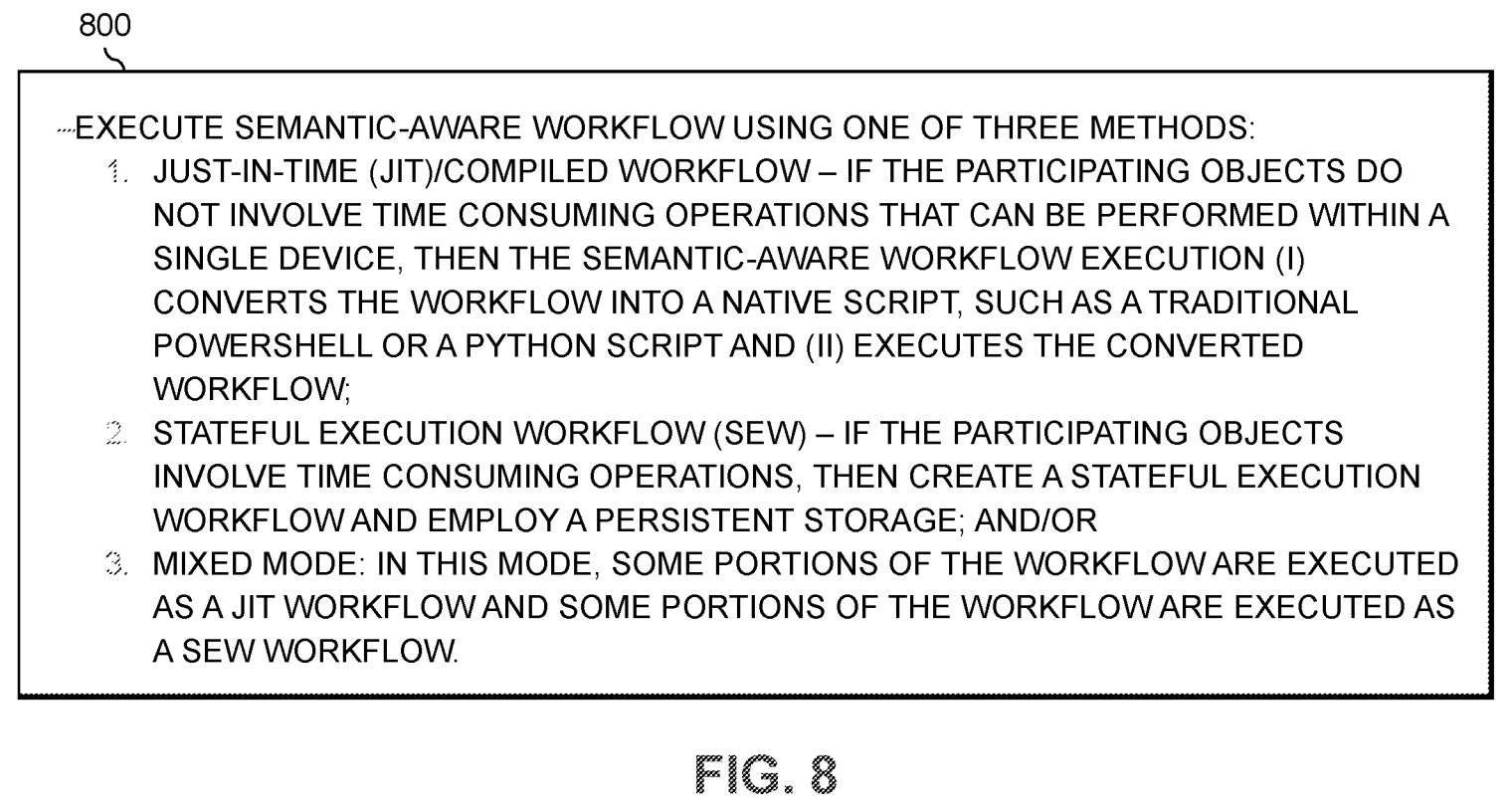

...EXECUTE SEMANTIC-AWARE WORKFLOW USING ONE OF THREE METHODS:

1. JUST-IN-TIME (JIT)/COMPILED WORKFLOW – IF THE PARTICIPATING OBJECTS DO NOT INVOLVE TIME CONSUMING OPERATIONS THAT CAN BE PERFORMED WITHIN A SINGLE DEVICE, THEN THE SEMANTIC-AWARE WORKFLOW EXECUTION (I) CONVERTS THE WORKFLOW INTO A NATIVE SCRIPT, SUCH AS A TRADITIONAL POWERSHELL OR A PYTHON SCRIPT AND (II) EXECUTES THE CONVERTED WORKFLOW;

2. STATEFUL EXECUTION WORKFLOW (SEW) – IF THE PARTICIPATING OBJECTS INVOLVE TIME CONSUMING OPERATIONS, THEN CREATE A STATEFUL EXECUTION WORKFLOW AND EMPLOY A PERSISTENT STORAGE; AND/OR

3. MIXED MODE: IN THIS MODE, SOME PORTIONS OF THE WORKFLOW ARE EXECUTED AS A JIT WORKFLOW AND SOME PORTIONS OF THE WORKFLOW ARE EXECUTED AS A SEW WORKFLOW.

Figures 9A, 9B, 9C:
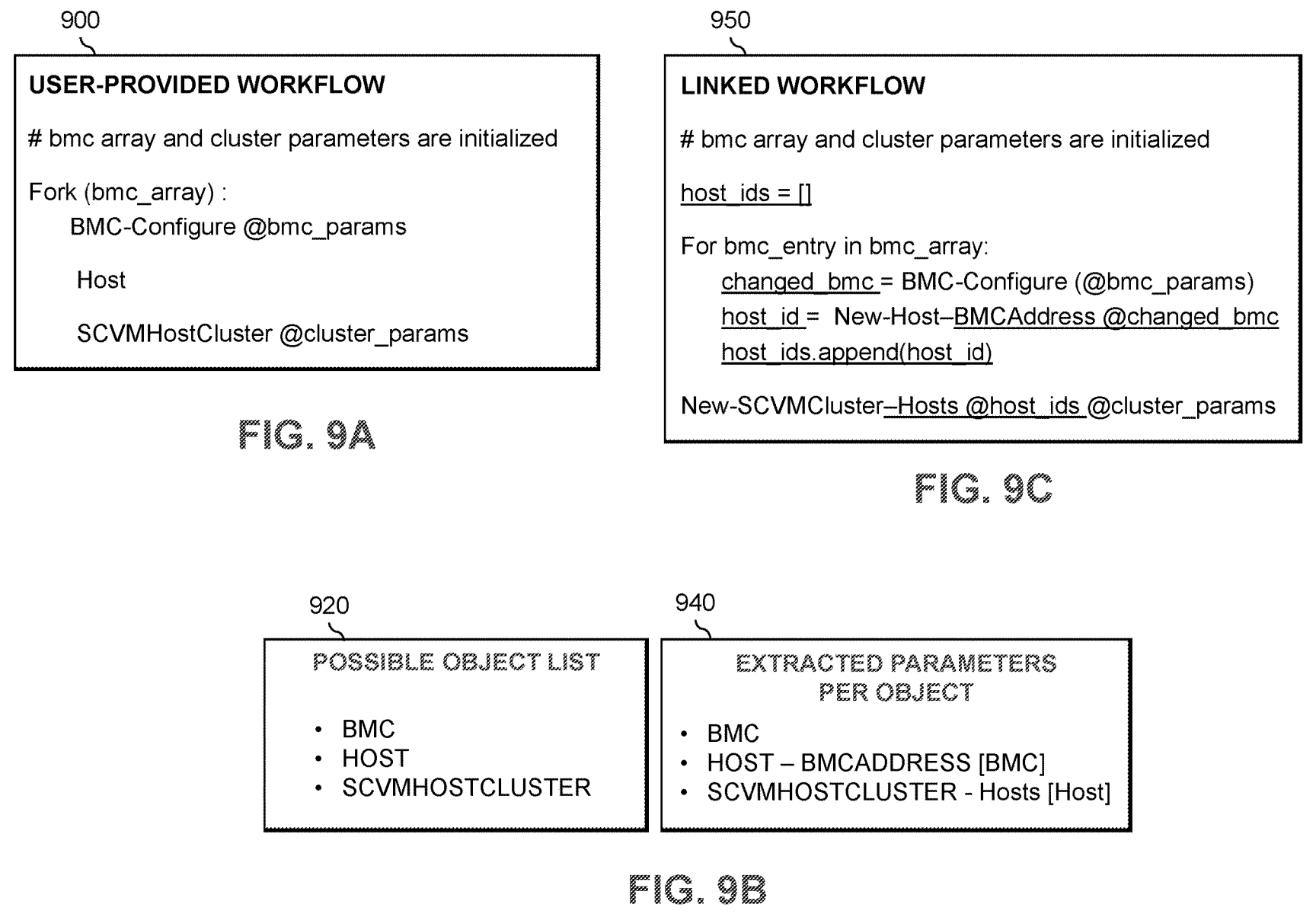

USER-PROVIDED WORKFLOW

\# bmc array and cluster parameters are initialized

Fork (bmc_array) :
    BMC-Configure @bmc_params

Host

SCVMHostCluster @cluster_params

POSSIBLE OBJECT LIST

- BMC
- HOST
- SCVMHOSTCLUSTER

940

EXTRACTED PARAMETERS PER OBJECT

- BMC
- HOST – BMCADDRESS [BMC]
- SCVMHOSTCLUSTER - Hosts [Host]

LINKED WORKFLOW

\# bmc array and cluster parameters are initialized host_ids = []

For bmc_entry in bmc_array:
    changed_bmc = BMC-Configure (@bmc_params)
    host_id = New-Host–BMCAddress @changed_bmc
    host_ids.append(host_id)

New-SCVMCluster–Hosts @host_ids @cluster_params

INJECTED WORKFLOW host array and cluster parameters are initialized host_ids = []

Figures 10A, 10B, 10C:
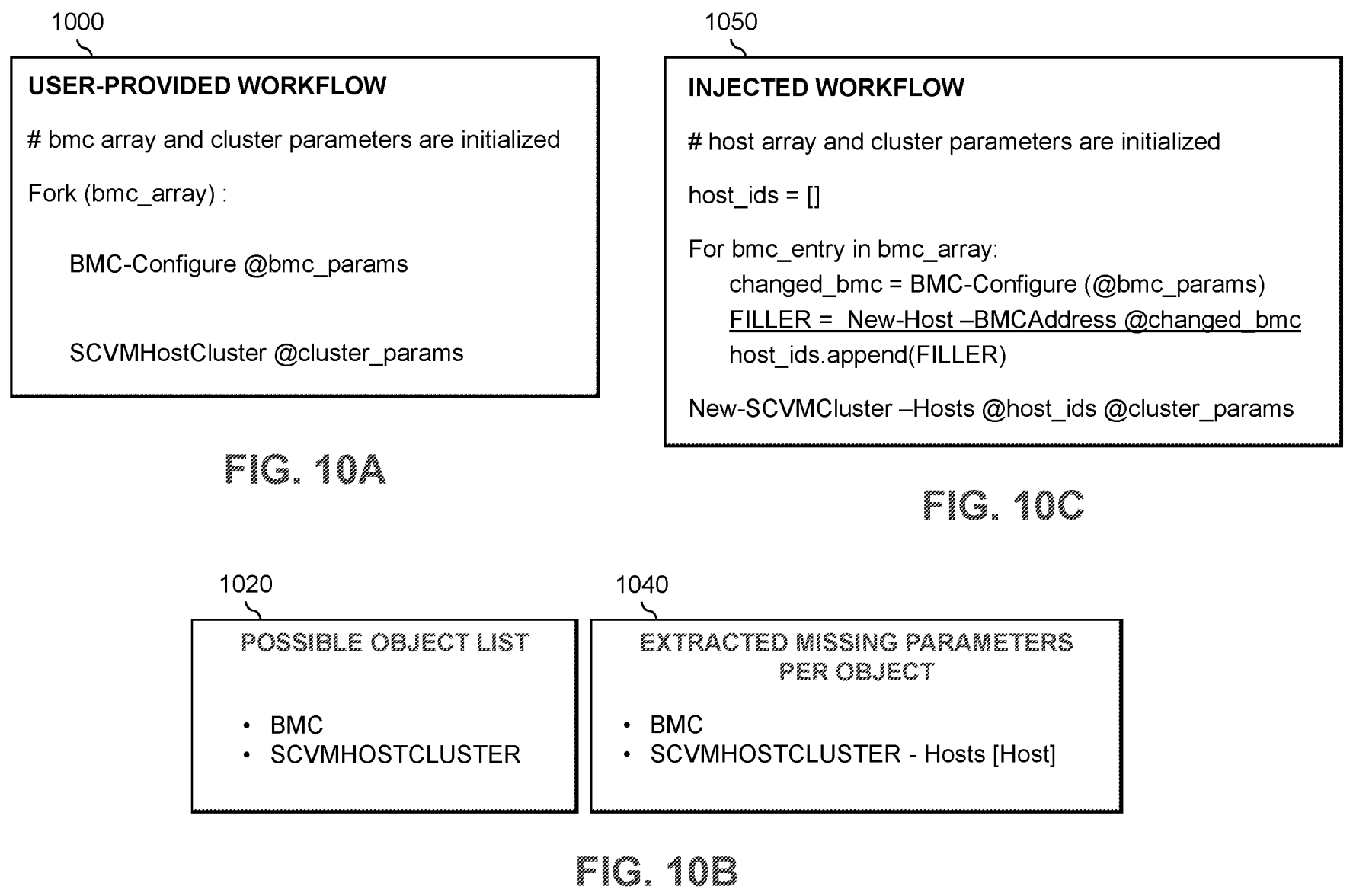

For bmc_entry in bmc_array:
    changed_bmc = BMC-Configure (@bmc_params)
    FILLER = New-Host –BMCAddress @changed_bmc
    host_ids.append(FILLER)

New-SCVMCluster –Hosts @host_ids @cluster_params

USER-PROVIDED WORKFLOW bmc array and cluster parameters are initialized

Fork (bmc_array) :

BMC-Configure @bmc_params

SCVMHostCluster @cluster_params

EXTRACTED MISSING PARAMETERS
PER OBJECT

- BMC
- SCVMHOSTCLUSTER - Hosts [Host]

POSSIBLE OBJECT LIST

- BMC
- SCVMHOSTCLUSTER

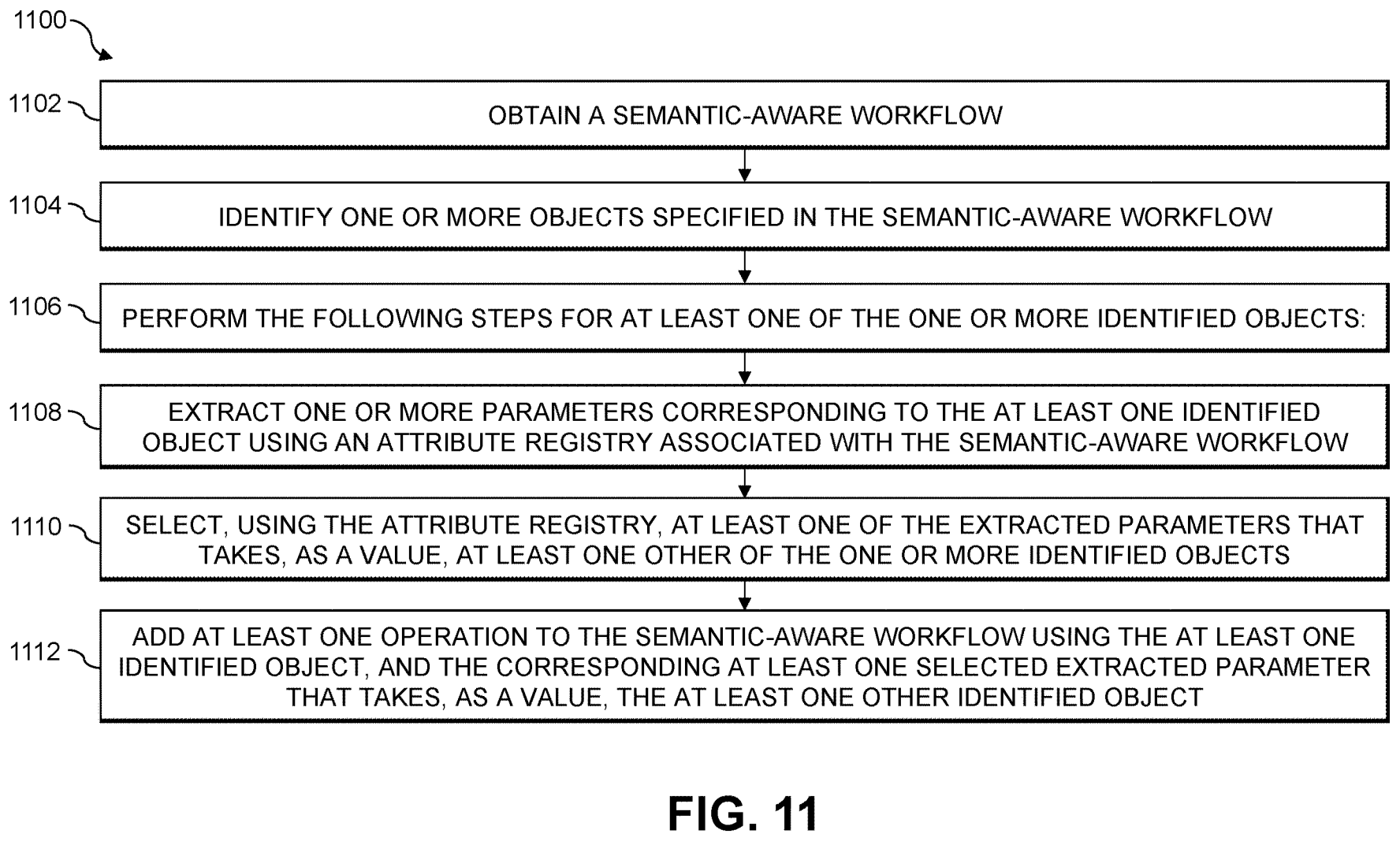

1100

1102 — OBTAIN A SEMANTIC-AWARE WORKFLOW

1104 — IDENTIFY ONE OR MORE OBJECTS SPECIFIED IN THE SEMANTIC-AWARE WORKFLOW

1106 — PERFORM THE FOLLOWING STEPS FOR AT LEAST ONE OF THE ONE OR MORE IDENTIFIED OBJECTS:

1108 — EXTRACT ONE OR MORE PARAMETERS CORRESPONDING TO THE AT LEAST ONE IDENTIFIED OBJECT USING AN ATTRIBUTE REGISTRY ASSOCIATED WITH THE SEMANTIC-AWARE WORKFLOW

1110 — SELECT, USING THE ATTRIBUTE REGISTRY, AT LEAST ONE OF THE EXTRACTED PARAMETERS THAT TAKES, AS A VALUE, AT LEAST ONE OTHER OF THE ONE OR MORE IDENTIFIED OBJECTS

1112 — ADD AT LEAST ONE OPERATION TO THE SEMANTIC-AWARE WORKFLOW USING THE AT LEAST ONE IDENTIFIED OBJECT, AND THE CORRESPONDING AT LEAST ONE SELECTED EXTRACTED PARAMETER THAT TAKES, AS A VALUE, THE AT LEAST ONE OTHER IDENTIFIED OBJECT

FIG. 11

SEMANTIC-AWARE WORKFLOW MODIFICATION AND EXECUTION WITH EXTRACTION OF MISSING PARAMETER

FIELD

The field relates generally to information processing systems, and more particularly to techniques for processing workflows in such information processing systems.

BACKGROUND

Infrastructure stacks, sometimes referred to as "full stacks," are often deployed in computing environments. An infrastructure stack comprises multiple layers of infrastructure elements, such as software elements, hardware elements and clusters of hardware elements, and often employs one or more management consoles for managing the infrastructure elements. For example, the infrastructure elements in an infrastructure stack may comprise software-defined storage elements, hyperconverged infrastructure, and various types of clusters. The management consoles allow multiple instances of a given infrastructure stack to be deployed and managed. Such infrastructure stacks can be problematic, particularly with regard to the manner in which workflows are managed and processed in an infrastructure stack.

SUMMARY

In one embodiment, a method comprises obtaining a semantic-aware workflow; identifying one or more objects specified in the semantic-aware workflow; performing the following steps for at least one of the one or more identified objects: extracting one or more parameters corresponding to the at least one identified object using an attribute registry associated with the semantic-aware workflow; selecting, using the attribute registry, at least one of the one or more extracted parameters that takes, as a value, at least one other of the one or more identified objects; and adding at least one operation to the semantic-aware workflow using the at least one identified object, and the corresponding at least one selected extracted parameter that takes, as a value, the at least one other identified object.

In some embodiments, the method further comprises determining that at least one of the selected extracted parameters comprises at least one missing mandatory parameter; identifying at least one first object in the one or more identified objects that can be converted to the at least one missing mandatory parameter; and generating the at least one missing mandatory parameter for the at least one selected extracted parameter using one or more parameter values of the at least one first object.

Other illustrative embodiments include, without limitation, apparatus, systems, methods and computer program products comprising processor-readable storage media.

BRIEF DESCRIPTION OF THE DRAWINGS

FIG. 6 illustrates an automatic linking process, in accordance with an embodiment of the disclosure;

FIG. 7 illustrates an automatic injection process, in accordance with one embodiment of the disclosure;

FIG. 8 illustrates three exemplary methods for executing a semantic-aware workflow in accordance with an illustrative embodiment;

FIGS. 9A through 9C illustrate exemplary code snippets and data structures processed by the automatic linking process of FIG. 6 in accordance with an illustrative embodiment;

FIGS. 10A through 10C illustrate exemplary code snippets and data structures processed by the automatic injection process of FIG. 7 in accordance with an illustrative embodiment;

FIG. 11 is a flow chart illustrating an exemplary implementation of a semantic-aware workflow creation process in accordance with an illustrative embodiment;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for semantic-aware workflow creation and execution.

Figure 1:
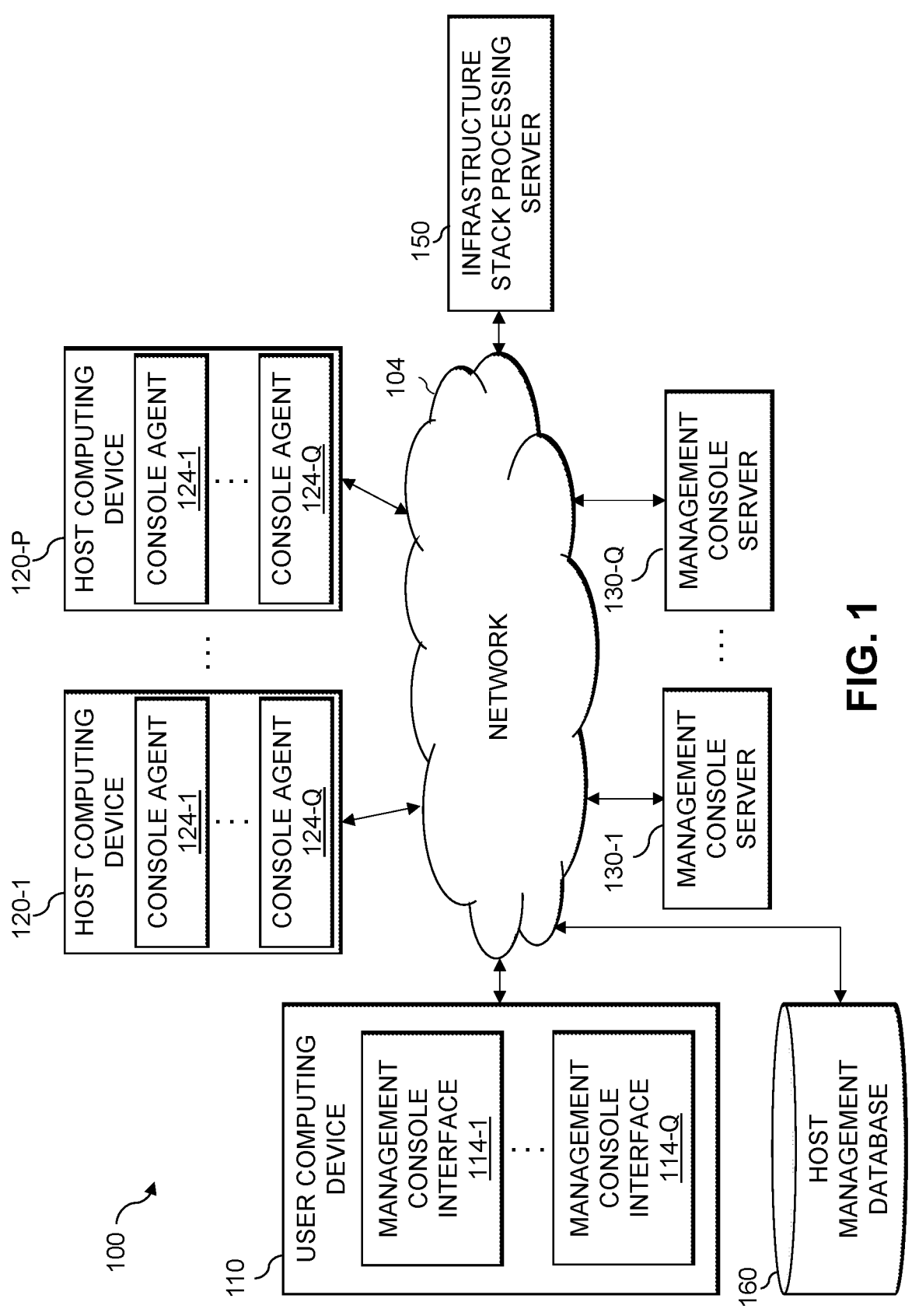
FIG. 1 illustrates an information processing system configured for semantic-aware workflow creation and execution in accordance with an illustrative embodiment.

FIG. 1 shows a computer network (also referred to herein as an information processing system) 100 configured in accordance with an illustrative embodiment. The computer network 100 comprises one or more user computing devices 110, a plurality of host computing devices 120-1 through 120-P, collectively referred to herein as host computing devices 120, a plurality of management console servers 130-1 through 130-Q, collectively referred to herein as management console servers 130, and one or more infrastructure stack processing servers 150. The user computing device 110, host computing devices 120, management console servers 130 and infrastructure stack processing server 150 are coupled to a network 104 in the example of FIG. 1, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment.

The one or more user computing devices 110 may each be associated with, for example, an IT administrator, and may comprise, for example, devices such as mobile telephones, laptop computers, tablet computers, desktop computers or other types of computing devices (e.g., virtual reality (VR)

devices or augmented reality (AR) devices). Some of these processing devices are also generally referred to herein as "computers." The user computing devices 110 may comprise a network client that includes networking capabilities such as ethernet, Wi-Fi, etc.

In the example of FIG. 1, the exemplary user computing device 110 comprises one or more management console user interfaces (UIs) 114-1 through 114-Q to interact with one or more of the management console servers 130, as discussed further below. It is noted that, in some embodiments, a given user computing device 110 may not require a management console UI 114 for each of the available management console servers 130. A representative management console server 130 is discussed further below in conjunction with FIG. 4. The one or more infrastructure stack processing servers 150 are discussed further below in conjunction with FIG. 5.

It is to be appreciated that the term "user" as used herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The host computing devices 120 may comprise, for example, server devices or other types of computers of an enterprise computer system, cloud-based computer system or other arrangement of multiple compute nodes associated with respective users. Such devices are examples of what are more generally referred to herein as "processing devices." Some of these processing devices are also generally referred to herein as "computers." The host computing devices 120 may comprise a network client that includes networking capabilities such as ethernet, Wi-Fi, etc.

For example, the host computing devices 120 in some embodiments illustratively provide compute services such as execution of one or more applications on behalf of each of one or more users associated with respective ones of the user computing devices 110. Such applications illustratively generate input-output (IO) operations that are processed by a storage system. The term "input-output" as used herein refers to at least one of input and output. For example, IO operations may comprise write requests and/or read requests directed to logical addresses of a particular logical storage volume of the storage system. These and other types of IO operations are also generally referred to herein as IO requests.

The host computing devices 120 in some embodiments may comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

In the example of FIG. 1, the exemplary host computing devices 120 comprise one or more console agents 124-1 through 124-Q to interact with one or more of the management console servers 130. An exemplary implementation of a representative host computing device 120 is discussed further below in conjunction with FIG. 3. It is noted that, in some embodiments, a given host computing device 120 may not require a console agent 124 for each of the available management console servers 130.

One or more of the user computing devices 110, host computing devices 120, management console servers 130, and/or infrastructure stack processing servers 150 illustratively comprise processing devices of one or more processing platforms. For example, a representative infrastructure stack processing server 150 can comprise one or more processing devices each having a processor, a memory and a network interface, possibly implementing virtual machines and/or containers, although numerous other configurations are possible. The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements. The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more of the user computing devices 110, host computing devices 120, management console servers 130, and/or infrastructure stack processing servers 150 can additionally or alternatively be part of edge infrastructure and/or cloud infrastructure such as an Amazon Web Services (AWS) system. Other examples of cloud-based systems that can be used to provide at least portions of the user computing devices 110, host computing devices 120, management console servers 130, and/or infrastructure stack processing servers 150 include Dell Cloud, Google Cloud Platform (GCP) and Microsoft Azure.

Additionally, one or more of the user computing devices 110, the host computing devices 120, the management console servers 130 and/or the infrastructure stack processing server 150 can have one or more associated host management databases 160. Although the management information is stored in the example of FIG. 1 in a single host management database 160, in other embodiments, an additional or alternative instance of the host management database 160, or portions thereof, may be incorporated into portions of the system 100.

The one or more host management databases 160 may be configured to store, for example, update baselines, vulnerability catalogs, update catalogs, attribute registries and/or workflow databases, portions thereof and/or multiple instances of any of the foregoing, as discussed further below. The host management database 160 may be accessed, for example, in connection with managing one or more of the host computing devices 120.

The one or more host management databases 160 can be implemented using one or more storage systems associated with the respective devices 110, 120, 130 and/or 150. Such storage systems can comprise any of a variety of different types of storage including such as network-attached storage (NAS), storage area networks (SANs), direct-attached storage (DAS) and distributed DAS, as well as combinations of these and other storage types, including software-defined storage.

The storage devices in such storage systems illustratively comprise solid state drives (SSDs). Such SSDs are implemented using NVM devices such as flash memory. Other types of NVM devices that can be used to implement at least a portion of the storage devices include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the storage system.

The term "storage system" as used herein is therefore intended to be broadly construed, and should not be viewed as being limited to particular storage system types, such as, for example, CAS (content-addressable storage) systems, distributed storage systems, or storage systems based on flash memory or other types of NVM storage devices. A given storage system as the term is broadly used herein can comprise, for example, any type of system comprising multiple storage devices, such as NAS, SANs, DAS and distributed DAS, as well as combinations of these and other storage types, including software-defined storage.

One or more of the user computing devices 110, host computing devices 120, management console servers 130 and/or infrastructure stack processing server 150 may be implemented on a common processing platform, or on separate processing platforms. The host computing devices 120 are illustratively configured to write data to and read data to/from a storage system in accordance with applications executing on those host devices for system users. One or more of the user computing devices 110, host computing devices 120, management console servers 130 and/or infrastructure stack processing server 150 may be implemented, for example, on the cloud or on the premises of an enterprise or another entity.

The host computing devices 120 are configured to interact over the network 104, for example, with one or more of the management console servers 130 and/or storage devices. Such interaction illustratively includes generating IO operations, such as write and read requests, and sending such requests over the network 104.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host computing devices 120 and a storage system to reside in different data centers. Numerous other distributed implementations of the host devices and storage systems are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the user computing devices 110, the host computing devices 120, the management console servers 130 and/or the infrastructure stack processing server 150 can be one or more input-output devices (not shown), which illustratively comprise keyboards, displays or other types of input-output devices in any combination. Such input-output devices can be used, for example, to support one or more user interfaces to such devices 110, 120, 130 and/or 150, as well as to support communication between such devices 110, 120, 130 and/or 150 and other related systems and devices not explicitly shown.

It is to be appreciated that this particular arrangement of elements in the user computing devices 110, the host computing devices 120 and/or the management console servers 130 of the FIG. 1 embodiment is presented by way of example only, and alternative arrangements can be used in other embodiments. For example, the functionality associated with at least some of the management console UIs 114-1 through 114-Q and/or console agents 124-1 through 124-Q in other embodiments can be implemented as a single element or device; separated across a larger number of elements; and/or implemented using multiple distinct processors. At least portions of such elements may be implemented at least in part in the form of software that is stored in memory and executed by a processor.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

It is to be understood that the particular set of elements shown in FIG. 1 for semantic-aware workflow creation and execution is presented by way of illustrative example only, and in other embodiments additional or alternative elements may be used. Thus, another embodiment includes additional or alternative systems, devices and other network entities, as well as different arrangements of modules and other components.

Figure 2:
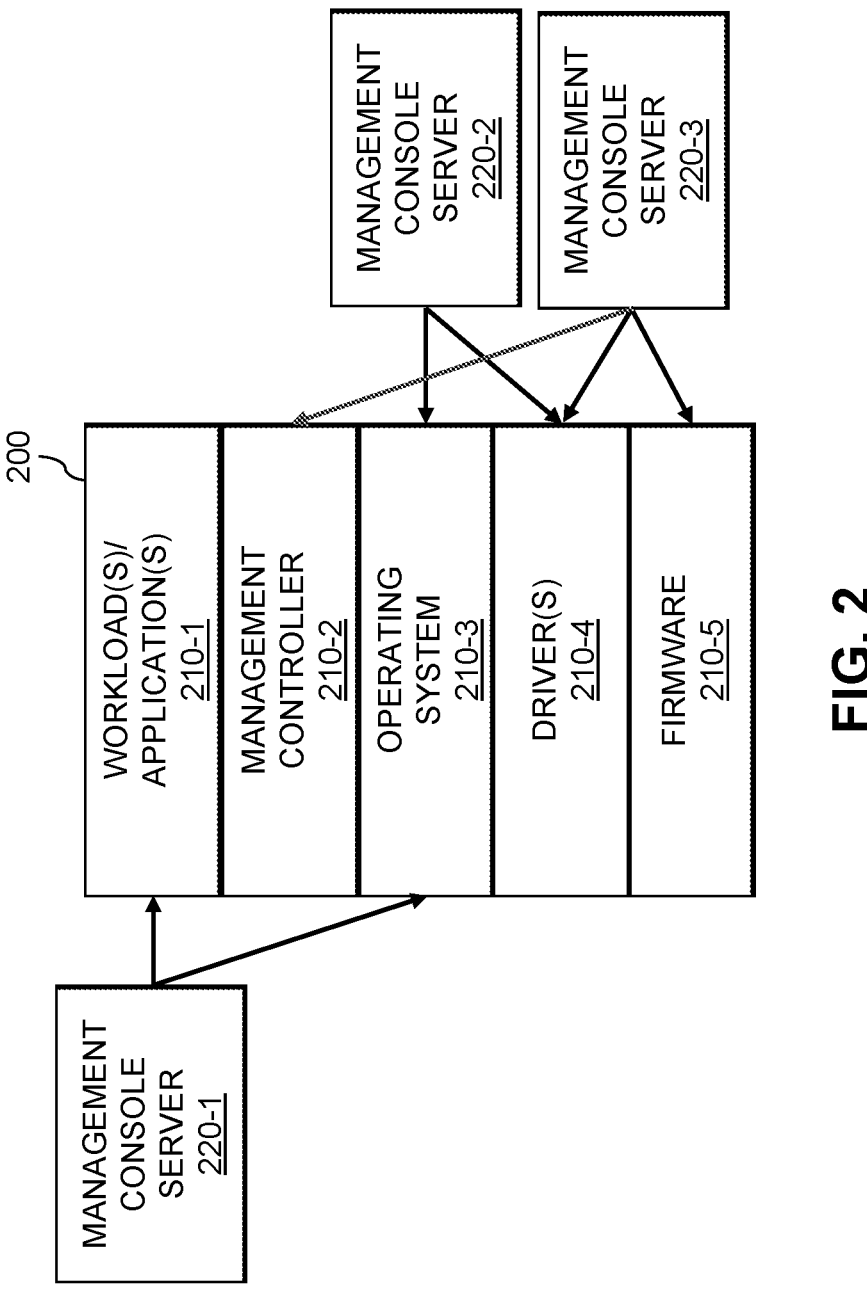
FIG. 2 illustrates an exemplary infrastructure stack related to the information processing system of FIG. 1 in accordance with an illustrative embodiment.

FIG. 2 illustrates an exemplary infrastructure stack 200 related to the information processing system of FIG. 1 in accordance with an illustrative embodiment. In the example of FIG. 2, the infrastructure stack 200 comprises a plurality of stack layers 210-1 through 210-5, such as a workloads or applications layer 210-1; a management controller layer 210-2, an operating system layer 210-3; a driver layer 210-4; and a firmware layer 210-5. The exemplary infrastructure stack 200 is managed by a plurality of management console servers 220-1 through 220-3. Each management console server 220 manages one or more layers of the infrastructure stack 200. In addition, in some embodiments, multiple management console servers 220 may manage at least some of the infrastructure elements in the same layer 210. In the example of FIG. 2, the management console server 220-1 and the management console server 220-2 both manage at least some of the infrastructure elements in the operating system layer 210-3 (potentially causing one or more inconsistencies).

In at least some embodiments, each layer 210 of the infrastructure stack 200 may have different attribute registries than other layers 210, and each layer 210 may have a different attribute registry for each technology variation (for example, a corresponding attribute registry may be provided by the provider of a given technology on each layer 210).

For example, an OpenManage Enterprise (OME) management console may manage, e.g., firmware, drivers and the management controller in layers 210-5, 210-4 and 210-2, respectively. In addition, an SCVMM (System Center Virtual Machine Manager) management console may manage, e.g., drivers and the operating system in layers 210-4 and 210-3, respectively. Further, an MECM (Microsoft Endpoint Configuration Manager) console may manage, e.g., drivers and the operating system in layers 210-4 and 210-3, respectively.

Figure 3:
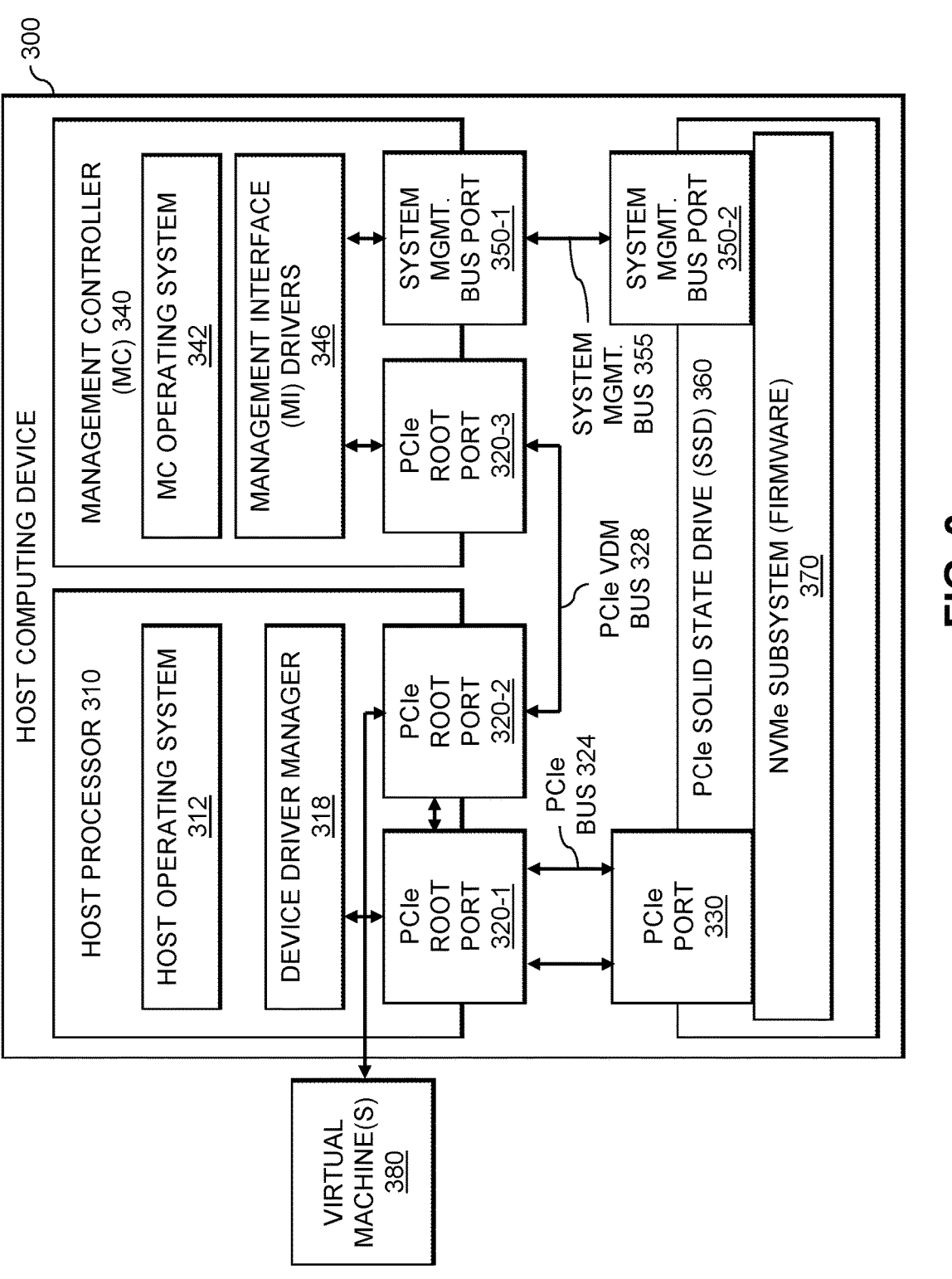
FIG. 3 illustrates an exemplary host computing device of FIG. 1 in further detail in accordance with an illustrative embodiment.

FIG. 3 illustrates an exemplary host computing device 300 in accordance with an illustrative embodiment. In the example of FIG. 3, the exemplary host computing device 300 comprises a host processor 310, a management controller (MC) 340 and a PCIe (Peripheral Component Interconnect Express) SSD 360. The exemplary host processor 310 comprises a host operating system 312 and a device driver manager 318 that comprises and manages one or more device drivers, such as an NVMe device driver (not specifically shown in FIG. 2). Such drivers may be configured, secured and/or updated in accordance with some embodiments of the disclosure, as discussed further below.

In addition, the host processor 310 comprises two PCIe root ports 320-1 and 320-2 for communicating with a PCIe port 330 of the PCIe SSD 360 and a PCIe root port 320-3 of the management controller 340, respectively. The PCIe root port 320-1 communicates with the PCIe port 330 of the PCIe SSD 360 using a PCIe bus 324. The PCIe root port 320-2 communicates with the PCIe root port 320-3 of the management controller 340 using a PCIe VDM (Vendor Defined Message) bus 328 that channelizes the information to the management controller 340.

In one or more embodiments, the exemplary management controller 340 further comprises an MC operating system 342 and one or more management interface (MI) drivers 346, such as an NVMe-MI driver (not specifically shown in FIG. 3). The management interface drivers 346 each comprise a command set and architecture for managing respective firmware, such as NVMe firmware, to discover, monitor, configure, and update firmware in multiple operating environments.

The exemplary management controller 340 also comprises a system management bus port 350-1 that communicates with a system management bus port 350-2 of the PCIe SSD 360 using a system management bus 355 based on a serial communication protocol. The management controller 340 may be implemented, for example, as a baseboard management controller (BMC), such as the Integrated Dell Remote Access Controller (iDRAC), commercially available from Dell Technologies, or another out of band (00B) controller.

In some embodiments, the exemplary host computing device 300 hosts one or more virtual machines 380 that communicate with at least portions of the exemplary host computing device 300 using the PCIe root port 320-2. For example, a given virtual machine 380 may directly request the management controller 340 (such as a BMC or an iDRAC) to update firmware (potentially bypassing the host operating system 312 and/or the drivers using a passthrough channel).

The exemplary PCIe SSD 360 is one example of a component of the exemplary host computing device 300 comprising firmware. As shown in the example of FIG. 3, the PCIe SSD 360 further comprises an NVMe subsystem 370 as an example of firmware that may be configured, secured and/or updated in accordance with some embodiments of the disclosure, as discussed further below.

Figure 4:
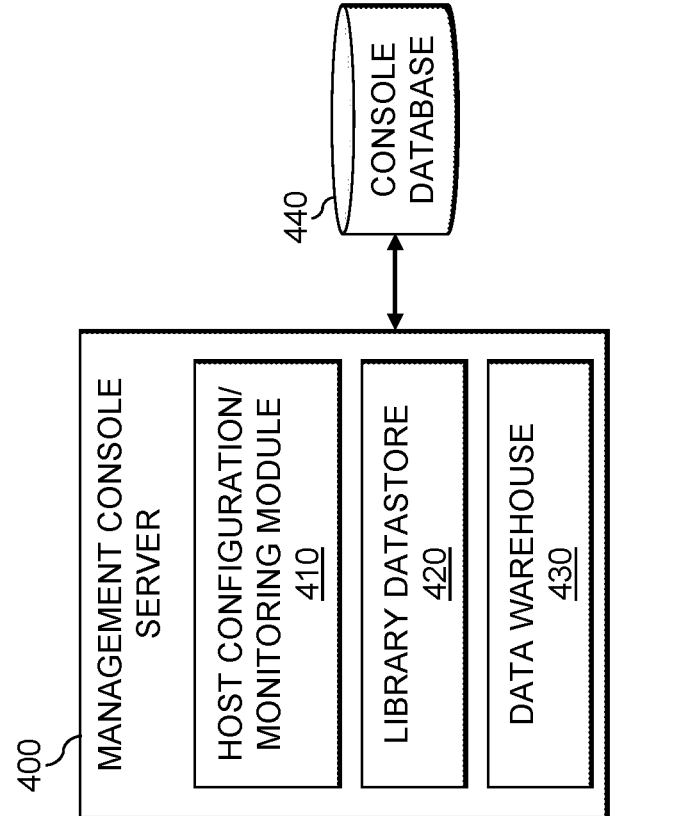
FIG. 4 illustrates an exemplary management console server of FIG. 1 in further detail in accordance with an illustrative embodiment.

FIG. 4 illustrates an exemplary management console server 400 in further detail in accordance with an illustrative embodiment. In the example of FIG. 4, the management console server 400 comprises a host configuration/monitoring module 410, a library datastore 420, and a data warehouse 430. A given management console server 400 may span (e.g., control) multiple clusters of the host computing devices 120 of FIG. 1.

The host configuration/monitoring module 410, in one or more embodiments, is configured to perform one or more functions for configuring, updating and/or monitoring one or more of the host computing devices 120 or other devices in the system 100 of FIG. 1. One or more of the management console servers 400 may be implemented in some embodiments, using an OpenManage Enterprise (OME) console, an SCVMM (System Center Virtual Machine Manager) console and/or an MECM (Microsoft Endpoint Configuration Manager) console.

In at least some embodiments, the management console server 400 can have one or more associated console databases 440 configured to store console data, such as information related to devices, update baselines, monitoring data (e.g., alerts and/or health status), and configuration data (e.g., configuration data related to clusters). Although the console information is stored in the example of FIG. 4 in a single console database 440, in other embodiments, an additional or alternative instance of the console database 440, or portions thereof, may be incorporated into portions of the system 100 of FIG. 1.

The library datastore 420 is configured in some embodiments to store, for example, operating system images, applications, patches and driver versions.

The data warehouse 430 is configured in some embodiments to store, for example, data from the console database 440 that has been pushed to the data warehouse 430, for example, for reporting purposes.

In at least some embodiments, techniques are provided for semantic-aware workflow creation and execution in the context of infrastructure management. The semantic-awareness stems at least in part from knowledge of the technologies through attribute registries, as discussed further below. Workflow engines, such as SAP (systems, applications, and products) ABAP (Advanced Business Application Programming), .Net (Workflow Management), and Cisco Intersight Workload Optimizer, are employed to execute one or more workflows. Workflow management tools are thus available and provide flexible methods for managing the workflows.

Infrastructure stack management tools may also employ workflow management tools, because workflow configuration may be orchestrated across different layers of an infrastructure stack. In addition, a number of components of an infrastructure stack perform job management. Thus, at least some infrastructure stack workflow engines provide a job manager that manages one or more jobs across an infrastructure stack.

The components of an infrastructure stack are typically organized as modules (such as PowerShell task automation and configuration management, REST (representational state transfer) software architectural software, and/or a python interpreted high-level general-purpose programming language). One or more aspects of the disclosure recognize that within the modules of a given layer, the workflow definitions are typically consistent and centered around objects (such as VMHost, VMHostGroup, Collection, and/or DriverPack objects). In addition, there is typically a defined sequence in which these objects are constructed (for example, a HostGroup must be created before a VMHost is created). Further, there is typically a specific set of lifecycle operations (e.g., Create, Modify, Delete, List/Retrieve) associated with these objects; and non-lifecycle operations (such as Move, Reset, Resume, Restart) are also present for certain objects. These objects typically take primitive values (such as hostname, credentials, strings, integers, Boolean) as parameters or other objects defined within the module as parameters. The parameter names are typically consistent within the module.

Across the multiple layers of an infrastructure stack, however, the terminologies may be typically different. For example, an iDRAC module may refer to a manager as "/iDRAC.Embedded.1", while an SCVMM management console may refer to the manager as a BMC (Baseboard Management Controller) and an MECM management console may refer to the manager as out-of-band management. Thus, the naming conventions in one layer of the infrastructure stack may refer to different names in a different layer of the infrastructure stack.

In one or more embodiments, a semantic-aware workflow management tool is provided that can be used to dynamically create custom workflows, with semantic-awareness to improve the customer experience. For example, in order to create a Cluster, a VM host group, multiple VM hosts and a VM host cluster are specified, with the corresponding object names and BMC addresses. The disclosed semantic-aware workflow manager can track and link the created objects automatically by passing them from one layer to another, as discussed further below (e.g., the user does not have to explicitly create the links; but rather, the user should ensure that the needed data is provided). In addition, the disclosed semantic-aware workflow manager can discover missing links. For example, if a user forgets to create a VMHost Group, and since that is a mandatory parameter for creation of a VMHost, the workflow manager can perform one or more automated remedial actions, such as notifying the user at design time and/or automatically correcting the coding error.

Figure 5:
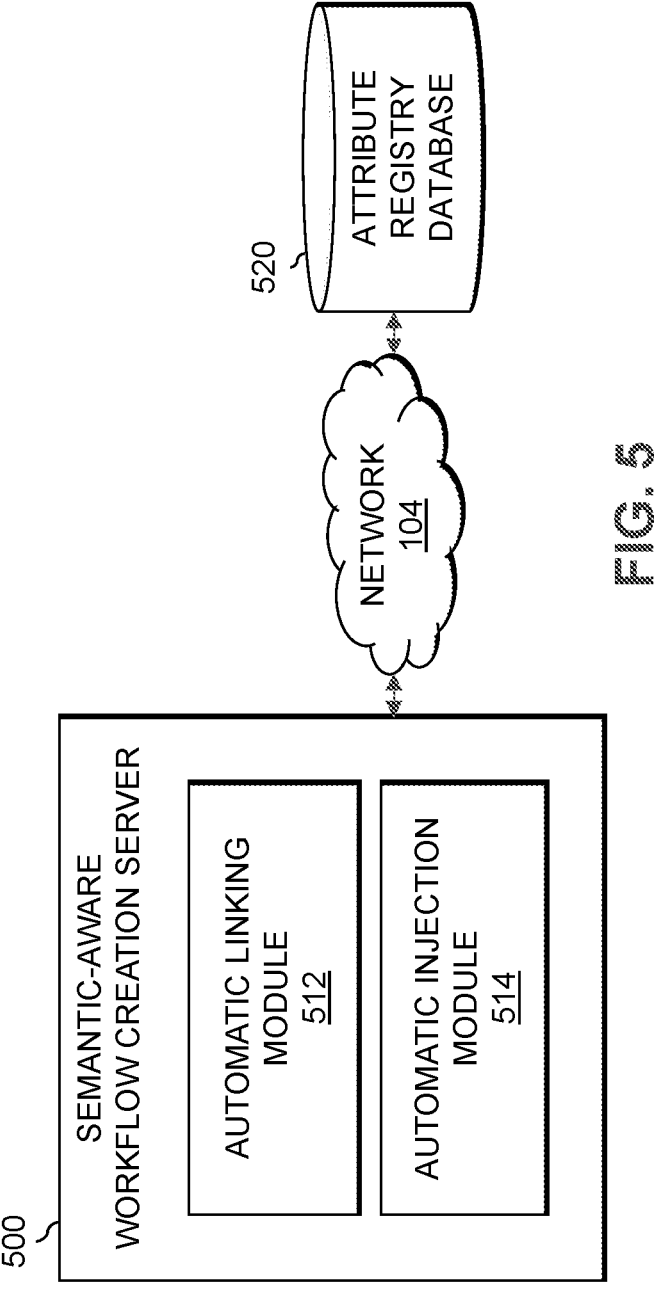
FIG. 5 illustrates an exemplary implementation of the infrastructure stack processing server of FIG. 1 as a semantic-aware workflow creation server, in accordance with one embodiment.

FIG. 5 illustrates an exemplary implementation of the infrastructure stack processing server 150 of FIG. 1 as a semantic-aware workflow creation server 500, in accordance with one embodiment. In the example of FIG. 5, the semantic-aware workflow creation server 500 comprises an automatic linking module 512 and an automatic injection module 514. The functionality of exemplary implementations of the automatic linking module 512 and the automatic injection module 514 is discussed further below in conjunction with FIGS. 6 and 7, respectively.

It is to be appreciated that this particular arrangement of modules 512, 514 illustrated in the semantic-aware workflow creation server 500 of FIG. 5 is presented by way of example only, and alternative arrangements can be used in other embodiments. For example, the functionality associated with elements 512, 514 in other embodiments can be implemented as a single element or device, or separated across a larger number of elements. As another example, multiple distinct processors can be used to implement different ones of elements 512, 514, or portions thereof.

At least portions of elements 512, 514 may be implemented at least in part in the form of software that is stored in memory and executed by a processor. An exemplary process utilizing elements 512, 514 of the semantic-aware workflow creation server 500 of FIG. 5 will be described in more detail with reference to, for example, FIGS. 6 through 8 and 11.

As shown in FIG. 5, the semantic-aware workflow creation server 500 employs one or more instances of an attribute registry database 520 that is configured to store one or more attribute registries associated with the semantic-aware workflows. Although the attribute information is stored in the example of FIG. 5 in a single attribute registry database 520, in other embodiments, an additional or alternative instance of the attribute registry database 520, or portions thereof, may be incorporated into portions of the system 100.

The attribute registries associated with the workflows can be created and stored in the attribute registry database 520. The objects that are present in a given registry can be collected (such as VMHost, VMHostGroup, and VMHost-Cluster). The creational patterns for such objects can be identified (such as Create, Modify, List/Retrieve and Delete). For example, for PowerShell, verbs are identified, such as New/Add/Install (create), Set (modify), List/Retrieve (Get), Remove (Delete). For REST, the active words correspond to Post, Put, Get, Delete. Similarly, for a python workflow, the active words correspond to create_, delete_, get_ and set operations.

Finally, within these patterns, a workflow management preparation process can identify the sequences in which objects can be created, to assist users in providing the proper elements in the workflow. For example, in a PowerShell implementation, users use a "new" command to create a new object, an "add" command to add an existing object into the system, and an "install" command to perform certain operations on an existing object to make the object compatible with the system and then to add the object to the system.

A workflow can be defined in some embodiments with the following elements:

workflow name;

package: identifies the set of attribute registries from the attribute registry database 520 that will be used within this workflow;

parameter linkages: when multiple attribute registries are used, they may use different definitions for the same entity. For example, an IP Address and Credentials in iDRAC uniquely map to BMC_Address and BMC_Credentials in an MECM or SCVMM console. Thus, the parameter linkages refer to which package variable maps to another package variable (for example, iDRAC.IPAddress=SCVMM.BMC_Address). In some implementations, such as those employing vCenter, this linkage may not be possible, as there is typically no such unique usage. Hence, the linkages may be performed through the variables; and variables/overrides: variables are used to collect input from the user through a user interface (UI) or a REST API. A user can specify: fixed values (such as port numbers); patterns that provide unique names to instances created/used by the workflow (e.g., hostnames, IP Addresses); and values to be selected from different data sources. In addition, variables can also be grouped, for example, to provide visual appeal and/or experience. Array variables may be used to collect information for multiple objects (such as hosts that go into a cluster). In some embodiments, the same variable can be passed to different parameters of objects (referred to as variable linkage) to help scenarios where parameter linkages are not possible.

In addition, the workflow definition may comprise a list of objects that participate in the workflow. The list sequence is typically from top to bottom (e.g., for a JSON list) or left to right (for a UI list). The user typically specifies only the values that are needed, such as host name, templates and accounts.

In at least some embodiments, the user can specify branching operations through "fork" and "consolidate" operations. For example, the fork operation operates on an array variable and can select an array of values, where the number of branches is equal to the number of entries in the array variable. Each branch takes one value from the array and the fork creates a private bag for each branch (e.g., host names). Once the fork processing is complete, then "consolidate" aggregates the fork results on object types (one or more object types), such as consolidating hosts. The consolidation waits until all of the branches of all forks that are creating this object type are completely executed.

In some embodiments, fork operations are treated as a separate workflow and consolidate operations are treated as if each fork is a separate stage, except that all of the stages are running in parallel.

In one or more embodiments, when specifying objects, a user can also specify the operation (such as New, Create, Reset, or Apply). If the operation is not specified, then the operation is typically assumed to be New or Modify. Finally, users can also mark certain workflow paths as being performed in parallel.

FIG. 6 illustrates an automatic linking process 600 in accordance with an embodiment of the disclosure. In the example of FIG. 6, the automatic linking process 600 comprises the following steps:

Scan the workflow for possible objects specified in the workflow, and place the discovered objects in a "possible objects list," as discussed further below in conjunction with, for example, FIG. 9B; and For each object in the "possible objects list":
1. From the attribute registry, extract the parameters corresponding to the current object;
2. From the extracted parameters, select one or more extracted parameters that take, as a value, another object in the "possible objects list";
3. Formulate a scriptlet that combines an operation (e.g., create, remove or modify), the current object, the selected extracted parameters and the other object corresponding to the selected extracted parameters; and
4. Emit the scriptlet to replace at least portions of the user-provided code.

In this manner, the automatic linking process 600 automatically links the created objects. In some embodiments, it may not be necessary that the created objects should be immediately preceding in a given section of code. The disclosed workflow manager creates a bag of objects (e.g., the "possible objects list") and collects the objects into that bag. Hence, in some embodiments, the workflow manager can automatically map those objects, as needed, as inputs to upcoming objects, as discussed further below in conjunction with FIGS. 9A through 9C. Given the semantic knowledge (of which objects are passed as parameters within a module), the workflow manager intelligently passes through objects that are needed. In the case of a branch, for example, the objects created within this branch and global objects alone can be used in subsequent invocations in the workflow.

An execution of the automatic linking process 600 can be triggered in at least some embodiments by a user asking the semantic-aware workflow creation server 500 to execute a semantic-aware workflow.

FIG. 7 illustrates an automatic injection process 700, in accordance with one embodiment of the disclosure. In the example of FIG. 7, the automatic injection process 700 comprises the following steps:

Scan the workflow for possible objects specified in the workflow. Place discovered objects in "possible objects list";

For each object, OBJ, in the "possible objects list":
1. From the attribute registry, extract all of the parameters corresponding to the current object;
2. From the extracted parameters, select one or more extracted parameters that take, as a value, another object (e.g., other than the current object, obj) in the "possible objects list";
3. For each selected extracted parameter, identify if there are any missing mandatory parameters, MISS, needed for a given selected extracted parameter;
4. For any missing mandatory parameters, MISS, identify any original object, ORIG, in the attribute registry that can be converted into the missing mandatory parameter, MISS;
5. Create a filler object by passing the parameter values of the original object, ORIG, to the filler object;
6. Pass the filler object to the missing mandatory parameter, MISS, identified in step 3 for the current object, OBJ; and
7. Emit a scriptlet comprising the missing mandatory parameter with the filler object.

In this manner, the automatic injection process 700 automatically injects missed objects into the workflow. For example, if a specific parameter (and hence the corresponding object) is missing in the workflow (such as VM Host Group), then the workflow looks for a "default constructor" (which takes in the objects relevant in this context and returns an instance of the missing object). If this is not possible, the workflow is halted. The exemplary default constructor constructs the missing object with objects found in the bag (e.g., converts an item available in the bag into the specific parameter (and corresponding object) that is missing in the workflow), as discussed further below in conjunction with FIGS. 10A through 10C. For example, a missing host object can be created without explicit user action in the workflow. In some embodiments, the automatic injection process 700 is performed when the automatic linking process 600 is unable to provide the needed links.

FIG. 8 illustrates three exemplary methods 800 for executing a semantic-aware workflow in accordance with an illustrative embodiment. In the example of FIG. 8, a semantic-aware workflow, or portions thereof, are executed using one of three methods:
1. Just-In-Time (JIT)/Compiled Workflow—if the participating objects do not involve time consuming operations (such as synchronous calls) that can be performed within a single device, then the semantic-aware workflow execution (i) converts the workflow into a native script, such as a traditional PowerShell or a python script and (ii) executes the converted workflow;
2. Stateful Execution Workflow (SEW)—if the participating objects involve time consuming operations (such as an OS installation or a firmware update operation), then create a stateful execution workflow and employ a persistent storage; and/or 3. Mixed Mode: in this mode, some portions of the workflow are executed as a JIT workflow and some portions of the workflow are executed as a SEW workflow The SEW workflow may create an asynchronous execution plan and proceed as follows, in at least some embodiments:

1. Create the workflow and its parameters as a row in a run table (a run identifier, run id, can be associated with this workflow);

2. SEW waits until all of the entries inside a run identifier are completed. Once completed, SEW takes up the next stage of the workflow and executes the next stage. If the next workflow stage returns a job identifier, a new entry is added to the run table with the stage identifier, a job identifier (returned by the execution) and a status of "in progress". The status field is updated from the status of the job identifier. If this workflow stage does not return a job identifier, the new entry will have the values of the stage, null and "Completed;" and 3. Execution continues until all stages are completed.

As discussed herein, in some embodiments, for a semantic-aware workflow, there is no need to explicitly pass arguments that represent semantic objects (e.g., host and cluster). Using the semantic information, the workflow, knowing what arguments are required, can select the appropriate arguments. This knowledge is acquired from the modules and the attribute registries. In the case of a non-semantic-aware workflow, the arguments typically need to be explicitly passed around.

In one or more embodiments, the semantic-aware workflows can identify intermediate and missing object definitions, and create them automatically. In this manner, the disclosed semantic-aware workflows do not require explicit definition of variables and automatically trace the intermediate variables. This improves error handling and also reduces compilation errors. The automatically-created information is derived at least in part by tracing through the dependencies and evaluating the parameters, where needed. In this manner, the need for long sections of code is reduced and users can focus on their work.

The disclosed semantic-aware workflows for infrastructure management problems cater to primary workflows of infrastructure management, such as lifecycle management use cases. The employed semantic knowledge stems from semantic-awareness of the technologies using the attribute registries. In this manner, semantic associations can be made without a need for explicit internal variable tracking. Traditionally, workflow managers needed internal variable tracking or linkages through UI workflows. In at least some embodiments, the disclosed semantic-aware workflows employ linkages only across packages (e.g., layers of the infrastructure stack). In addition, missing objects can be inferred and added (by semantic tracing using created objects). This simplifies the workflows even further, allowing the workflow manager to make intelligent decisions. Semantics are also employed on fork operations applied to an array variable, and consolidate operations applied to object types wait for all fork operations related to those objects to be completed.

FIGS. 9A through 9C illustrate exemplary code snippets 900, 950 and data structures 920 and 940 processed by the automatic linking process 600 of FIG. 6 in accordance with an illustrative embodiment. In the example of FIG. 9A, a user-provided workflow 900 is provided as an input to an instance of the automatic linking process 600. The automatic linking process 600 generates the linked workflow 950 shown in FIG. 9C by automatically inserting the underlined code, using a possible object list 920 to collect the objects discovered in the workflow, and a set 940 of extracted parameters for each object in the possible object list 920, as shown in FIG. 9B.

As noted above, the possible object list 920 is generated by scanning the user-provided workflow 900 for possible objects specified in the workflow, and storing such possible objects in the possible objects list 920. The parameters corresponding to each of the objects in the possible object list 920 are then extracted from the attribute registry to construct the set 940 of extracted parameters for each object.

For example, from one or more attribute registries in the attribute registry database 520, it can be determined that an object, Host has a parameter "BMCAddress" that takes BMC (from the possible object list 920) as its value. Likewise, an object HostCluster has a parameter "Hosts" that takes Host (from the possible object list 920) as its value. These extracted parameters are shown in the set 940 of extracted parameters for each object shown in FIG. 9B. In this manner, the host creation step that was omitted by the user in the user-provided workflow 900 can be automatically provided by the automatic linking process 600 in the linked workflow 950 to automatically create the needed host objects.

FIGS. 10A through 10C illustrate exemplary code snippets 1000, 1050 and data structures 1020 and 1040 processed by the automatic injection process 700 of FIG. 7 in accordance with an illustrative embodiment. In the example of FIG. 10A, a user-provided workflow 1000 is provided as an input to an instance of the automatic injection process 700. The automatic injection process 700 generates the injected workflow 1050 shown in FIG. 10C by automatically inserting the underlined code, using a possible object list 1020 to collect the objects discovered in the workflow, and a set 1040 of extracted missing parameters for each object in the possible object list 1020, as shown in FIG. 10B.

As noted above, the possible object list 1020 is generated by scanning the user-provided workflow 1000 for possible objects specified in the workflow, and storing such possible objects in the possible objects list 1020. The parameters corresponding to each of the objects in the possible object list 1020 are then extracted from the attribute registry to construct the set 1040 of extracted missing parameters for each object.

In the example of FIG. 10B, the automatic injection process 700 recognizes that the SCVMHostCluster object has a mandatory parameter "Hosts" that needs a Host object. Thus, when performing the steps of the automatic injection process 700 shown in FIG. 7, the missing mandatory parameters, MISS, is populated with Host, and the original object, ORIG, in the attribute registry that can be converted into the missing mandatory parameter, MISS, is a BMC object (e.g., the attribute registry indicates that a BMC object can be converted into a Host object). Since there is no direct path to create a cluster from a BMC, the host cluster objects needs the mandatory parameter of host, as indicated in the attribute registry.

FIG. 11 is a flow chart illustrating an exemplary implementation of a semantic-aware workflow creation process 1100 in accordance with an illustrative embodiment. In the example of FIG. 11, the semantic-aware workflow creation process 1100 initially obtains a semantic-aware workflow in step 1102.

In step 1104, the semantic-aware workflow creation process 1100 identifies one or more objects specified in the semantic-aware workflow. A loop is started in step 1106 to perform the following steps 1108, 1110 and 1112 for at least one of the one or more identified objects.

In step 1108, one or more parameters corresponding to the at least one identified object are extracted using an attribute registry associated with the semantic-aware workflow. In step 1110, the semantic-aware workflow creation process 1100 selects, using the attribute registry, at least one of the one or more extracted parameters that takes, as a value, at least one other of the one or more identified objects.

At least one operation is added in step 1112 to the semantic-aware workflow using the at least one identified object, and the corresponding at least one selected extracted parameter that takes, as a value, the at least one other identified object.

In some embodiments, the at least one added operation may comprise an object creation operation, an object removal operation and/or an object deletion operation. The steps of the semantic-aware workflow creation process 1100 may also include determining that at least one of the selected extracted parameters comprises at least one missing mandatory parameter; identifying at least one first object in the one or more identified objects that can be converted to the at least one missing mandatory parameter; generating the at least one missing mandatory parameter for the at least one selected extracted parameter using one or more parameter values of the at least one first object; and updating the semantic-aware workflow using the at least one generated missing mandatory parameter.

The particular processing operations and other functionality described in conjunction with FIGS. 6, 7, 8 and 11 are presented by way of illustrative example only, and should not be construed as limiting the scope of the disclosure in any way. Alternative embodiments can use other types of processing operations for semantic-aware workflow creation and execution. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

For additional details related to management, configuration, update, security, deployment and/or processing of infrastructure stacks, see, for example, U.S. patent application Ser. No. 17/586,073, entitled "Server Device Updates Using Update Baselines Tagged Across Multiple Management Consoles," (now U.S. Pat. No. 12,117,973; U.S. patent application Ser. No. 17/586,099, entitled "Identifying and Mitigating Security Vulnerabilities in Multi-Layer Infrastructure Stack,"; and/or U.S. patent application Ser. No. 17/586,112, entitled "Generating Multi-Layer Configuration Templates for Deployment Across Multiple Infrastructure Stack Layers," (now U.S. Pat. No. 11,647,105), each filed contemporaneously herewith and incorporated by reference herein in its entirety.

One or more embodiments of the disclosure provide improved methods, apparatus and computer program products for semantic-aware workflow creation and execution. The foregoing applications and associated embodiments should be considered as illustrative only, and numerous other embodiments can be configured using the techniques disclosed herein, in a wide variety of different applications.

It should also be understood that the disclosed semantic-aware workflow management techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for semantic-aware workflow creation and execution may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based semantic-aware workflow management engine, or portions thereof, are illustratively implemented for use by tenants of such a multi-tenant environment.

Virtual machines provided in cloud-based systems can be used to implement at least portions of a cloud-based semantic-aware workflow management platform in illustrative embodiments. The cloud-based systems can include, for example, object stores.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 12 and 13. These platforms may also be used to implement at least portions of other information processing systems in other embodiments.

Figure 12:
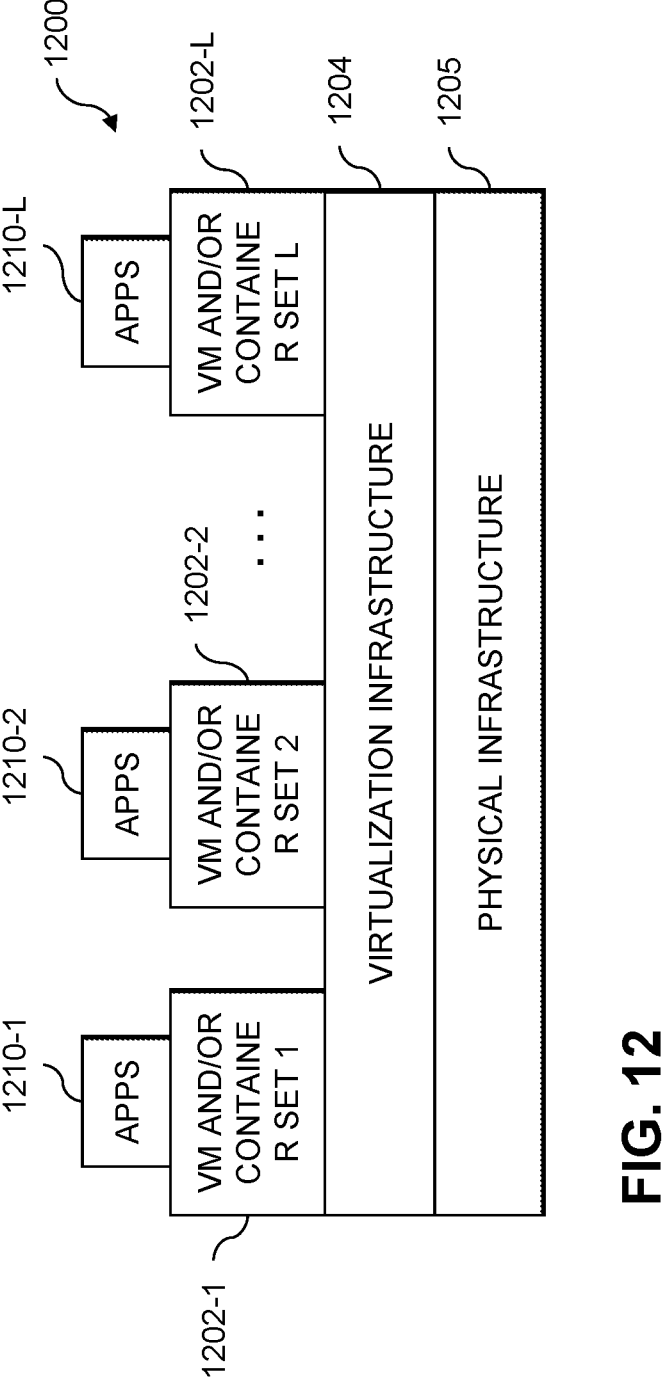
FIG. 12 illustrates an exemplary processing platform that may be used to implement at least a portion of one or more embodiments of the disclosure comprising a cloud infrastructure.

FIG. 12 shows an example processing platform comprising cloud infrastructure 1200. The cloud infrastructure 1200 comprises a combination of physical and virtual processing resources that may be utilized to implement at least a portion of the information processing system 100. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. Such implementations can provide semantic-aware workflow management functionality of the type described above for one or more processes running on a given one of the VMs. For example, each of the VMs can implement semantic-aware workflow management control logic and associated semantic-aware workflow creation and execution functionality for one or more processes running on that particular VM.

An example of a hypervisor platform that may be used to implement a hypervisor within the virtualization infrastructure 1204 is the VMware® vSphere® which may have an associated virtual infrastructure management system such as the VMware® vCenter™. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system. Such implementations can provide semantic-aware workflow management functionality of the type described above for one or more processes running on different ones of the containers. For example, a container host device supporting multiple containers of one or more container sets can implement one or more instances semantic-aware workflow management control logic and associated semantic-aware workflow creation and execution functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises at least a portion of the given system and includes a plurality of processing devices, denoted 1302-1, 1302-2, 1302-3, . . . 1302-K, which communicate with one another over a network 1304. The network 1304 may comprise any type of network, such as a WAN, a LAN, a satellite network, a telephone or cable network, a cellular network, a wireless network such as WiFi or WiMAX, or various portions or combinations of these and other types of networks.

The processing device 1302-1 in the processing platform 1300 comprises a processor 1310 coupled to a memory 1312. The processor 1310 may comprise a microprocessor, a CPU, a GPU, a TPU, a microcontroller, an ASIC, an FPGA or other type of processing circuitry, as well as portions or combinations of such circuitry elements, and the memory 1312, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and the given system may include additional or alternative processing platforms, as well as numerous distinct processing platforms in any combination, with each such platform comprising one or more computers, storage devices or other processing devices.

Figure 13:
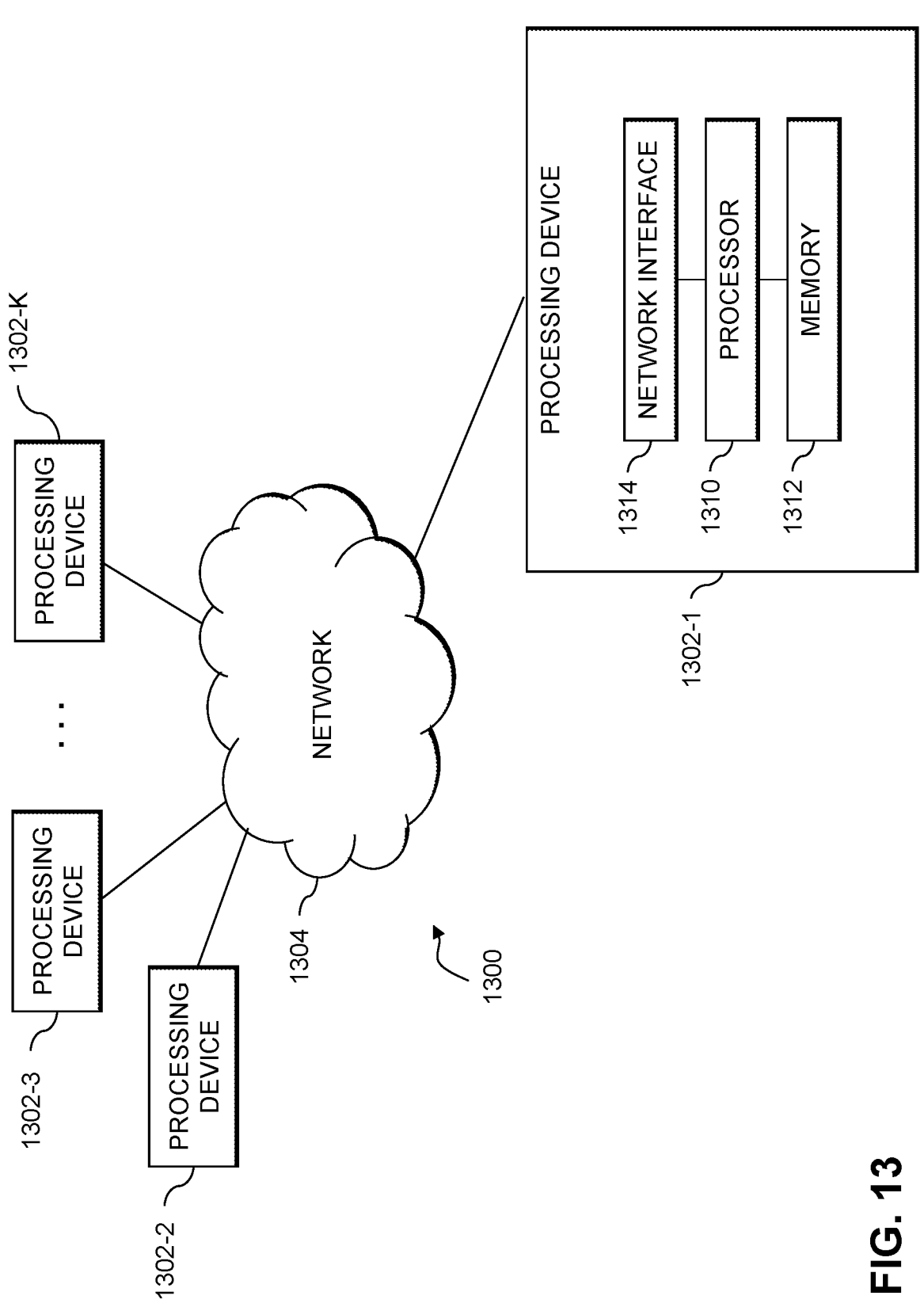
FIG. 13 illustrates another exemplary processing platform that may be used to implement at least a portion of one or more embodiments of the disclosure.

Multiple elements of an information processing system may be collectively implemented on a common processing platform of the type shown in FIG. 12 or 13, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining a semantic-aware workflow;

obtaining a plurality of attribute registries, wherein each attribute registry is associated with at least one component in a given stack layer of a plurality of stack layers of at least one infrastructure stack, wherein the semantic-awareness of the semantic-aware workflow is based at least in part on knowledge of one or more technologies in at least some of the plurality of attribute registries;

storing at least some of the plurality of attribute registries in an attribute registry database;

identifying a set of two or more objects specified in the semantic-aware workflow to create a possible objects list;

performing, for at least one of the two or more identified objects in the possible objects list:

extracting one or more parameters corresponding to the at least one identified object in the possible objects list from at least one attribute registry, of the at least some of the plurality of attribute registries stored in the attribute registry database, associated with the semantic-aware workflow;

selecting, using the at least one attribute registry, at least one of the one or more extracted parameters that takes, as a value, at least one other of the two or more identified objects, specified in the semantic-aware workflow, in the possible objects list;

generating at least one executable script comprising (i) at least one operation to modify the semantic-aware workflow, (ii) the at least one identified object, and (iii) the corresponding at least one selected extracted parameter that takes, as a value, the at least one other identified object;

initiating an execution of the at least one executable script to modify at least a portion of the semantic-aware workflow using the at least one operation, wherein the modification of the semantic-aware workflow comprises inserting at least a portion of software code into the semantic-aware workflow using the corresponding at least one selected extracted parameter; and initiating an execution of the modified semantic-aware workflow;

wherein the method is performed by at least one processing device comprising a processor coupled to a memory.

2. The method of claim 1, wherein the at least one operation comprises one or more of an object creation operation, an object removal operation and an object deletion operation.

3. The method of claim 1, further comprising performing the extracting, the selecting and a generation of the at least one operation for each identified object.

4. The method of claim 1, further comprising determining that at least one of the selected extracted parameters comprises at least one missing mandatory parameter; identifying at least one first object in the two or more identified objects that can be converted to the at least one missing mandatory parameter; and generating the at least one missing mandatory parameter for the at least one selected extracted parameter using one or more parameter values of the at least one first object.

5. The method of claim 4, further comprising updating the semantic-aware workflow using the at least one generated missing mandatory parameter.

6. The method of claim 1, further comprising selecting one of a plurality of available execution methods to execute the at least one operation.

7. The method of claim 1, wherein the attribute registry comprises a plurality of objects and, for a given object, identifies one or more parameters associated with the given object.

8. An apparatus comprising:

at least one processing device comprising a processor coupled to a memory;

the at least one processing device being configured to implement steps of:

obtaining a semantic-aware workflow;

obtaining a plurality of attribute registries, wherein each attribute registry is associated with at least one component in a given stack layer of a plurality of stack layers of at least one infrastructure stack, wherein the semantic-awareness of the semantic-aware workflow is based at least in part on knowledge of one or more technologies in at least some of the plurality of attribute registries;

storing at least some of the plurality of attribute registries in an attribute registry database;

identifying a set of two or more objects specified in the semantic-aware workflow to create a possible objects list;

performing, for at least one of the two or more identified objects in the possible objects list:

extracting one or more parameters corresponding to the at least one identified object in the possible objects list from at least one attribute registry, of the at least some of the plurality of attribute registries stored in the attribute registry database, associated with the semantic-aware workflow;

selecting, using the at least one attribute registry, at least one of the one or more extracted parameters that takes, as a value, at least one other of the two or more identified objects, specified in the semantic-aware workflow, in the possible objects list;

generating at least one executable script comprising (i) at least one operation to modify the semantic-aware workflow, (ii) the at least one identified object, and (iii) the corresponding at least one selected extracted parameter that takes, as a value, the at least one other identified object;

initiating an execution of the at least one executable script to modify at least a portion of the semantic-aware workflow using the at least one operation, wherein the modification of the semantic-aware workflow comprises inserting at least a portion of software code into the semantic-aware workflow using the corresponding at least one selected extracted parameter; and initiating an execution of the modified semantic-aware workflow.

9. The apparatus of claim 8, wherein the at least one operation comprises one or more of an object creation operation, an object removal operation and an object deletion operation.

10. The apparatus of claim 8, further comprising performing the extracting, the selecting and a generation of the at least one operation for each identified object.

11. The apparatus of claim 8, further comprising determining that at least one of the selected extracted parameters comprises at least one missing mandatory parameter; identifying at least one first object in the one or more identified objects that can be converted to the at least one missing mandatory parameter; and generating the at least one missing mandatory parameter for the at least one selected extracted parameter using one or more parameter values of the at least one first object.

12. The apparatus of claim 11, further comprising updating the semantic-aware workflow using the at least one generated missing mandatory parameter.

13. The apparatus of claim 8, further comprising selecting one of a plurality of available execution methods to execute the at least one operation.

14. The apparatus of claim 8, wherein the attribute registry comprises a plurality of objects and, for a given object, identifies one or more parameters associated with the given object.

15. A non-transitory processor-readable storage medium having stored therein program code of one or more software programs, wherein the program code when executed by at least one processing device causes the at least one processing device to perform steps of:

obtaining a semantic-aware workflow;

obtaining a plurality of attribute registries, wherein each attribute registry is associated with at least one component in a given stack layer of a plurality of stack layers of at least one infrastructure stack, wherein the semantic-awareness of the semantic-aware workflow is based at least in part on knowledge of one or more technologies in at least some of the plurality of attribute registries;

storing at least some of the plurality of attribute registries in an attribute registry database;

identifying a set of two or more objects specified in the semantic-aware workflow to create a possible objects list;

performing, for at least one of the two or more identified objects in the possible objects list:

extracting one or more parameters corresponding to the at least one identified object in the possible objects list from at least one attribute registry, of the at least some of the plurality of attribute registries stored in the attribute registry database, associated with the semantic-aware workflow;

selecting, using the at least one attribute registry, at least one of the one or more extracted parameters that takes, as a value, at least one other of the two or more identified objects, specified in the semantic-aware workflow, in the possible objects list;

generating at least one executable script comprising (i) at least one operation to modify the semantic-aware workflow, (ii) the at least one identified object, and (iii) the corresponding at least one selected extracted parameter that takes, as a value, the at least one other identified object;

initiating an execution of the at least one executable script to modify at least a portion of the semantic-aware workflow using the at least one operation, wherein the modification of the semantic-aware workflow comprises inserting at least a portion of software code into the semantic-aware workflow using the corresponding at least one selected extracted parameter; and initiating an execution of the modified semantic-aware workflow.

16. The non-transitory processor-readable storage medium of claim 15, further comprising performing the extracting, the selecting and a generation of the at least one operation for each identified object.

17. The non-transitory processor-readable storage medium of claim 15, further comprising determining that at least one of the selected extracted parameters comprises at least one missing mandatory parameter; identifying at least one first object in the two or more identified objects that can be converted to the at least one missing mandatory parameter; and generating the at least one missing mandatory parameter for the at least one selected extracted parameter using one or more parameter values of the at least one first object.

18. The non-transitory processor-readable storage medium of claim 17, further comprising updating the semantic-aware workflow using the at least one generated missing mandatory parameter.

19. The non-transitory processor-readable storage medium of claim 15, further comprising selecting one of a plurality of available execution methods to execute the at least one operation.

20. The non-transitory processor-readable storage medium of claim 15, wherein the attribute registry comprises a plurality of objects and, for a given object, identifies one or more parameters associated with the given object.

* * * * *